United States Patent
Moutaux et al.

(10) Patent No.: US 6,906,635 B1
(45) Date of Patent: Jun. 14, 2005

(54) TELECOMMUNICATION SYSTEM INCLUDING DEVICE CONTROLLER WITH DOWNLOADABLE INTERFACE AND REMOTE CONTROL, AND METHOD FOR CONTROLLING COMMUNICATION SYSTEM

(75) Inventors: Tony Moutaux, Illkirch-Graffenstaden (FR); Frederic Pennerath, Strasbourg (FR); Laurent Redouloux, Strasbourg (FR)

(73) Assignee: Alcatel, Paris (FR)

( * ) Notice: Subject to any disclaimer, the term of this patent is extended or adjusted under 35 U.S.C. 154(b) by 609 days.

(21) Appl. No.: 09/616,910

(22) Filed: Jul. 14, 2000

(30) Foreign Application Priority Data

Jul. 16, 1999 (EP) ............................................ 99440201

(51) Int. Cl.[7] ............................................. G05B 19/02
(52) U.S. Cl. ............................ 340/825.22; 340/825.69; 340/825.72; 340/5.64; 340/5.6; 340/5.61; 340/825.27; 341/176
(58) Field of Search ........................ 340/825.22, 825.69, 340/5.6, 5.64; 341/176

(56) References Cited

U.S. PATENT DOCUMENTS 5,410,326 A * 4/1995 Goldstein ..................... 348/134
5,500,794 A     3/1996 Fujita et al.
5,579,221 A    11/1996 Mun
5,909,183 A *  6/1999 Borgstahl et al. ........ 340/825.22
5,963,624 A * 10/1999 Pope ......................... 379/110.01

FOREIGN PATENT DOCUMENTS

| EP | 0 626 635 A2 | 11/1994 |
| EP | 0 825 740 A2 | 2/1998 |
| EP | WO 98/49663 | 11/1998 |
| EP | 0 907 271 A1 | 4/1999 |
| EP | 0 907 272 A1 | 4/1999 |
| EP | 0 907 273 A1 | 4/1999 |
| EP | 0 907 274 A1 | 4/1999 |
| EP | 0 907 275 A1 | 4/1999 |
| WO | WO 98/592284 | 12/1998 |

* cited by examiner

*Primary Examiner*—Michael Horabik
*Assistant Examiner*—Vernal Brown
(74) *Attorney, Agent, or Firm*—Sughrue Mion, PLLC

(57) ABSTRACT

Telecommunication systems, which includes a controller (gateway/server), devices (TV, VCR, refrigerator, security system) and a remote control unit for remotely controlling the devices via the controller, is made more flexible and more user-friendly by allowing an interface like a user-interface and/or device-interface to be downloaded into the remote control unit, in response to a trigger-signal comprising a user-identification and/or a device-identification generated due to a user operating the remote control unit or generated due to an interface-amendment reported to the system.

10 Claims, 1 Drawing Sheet

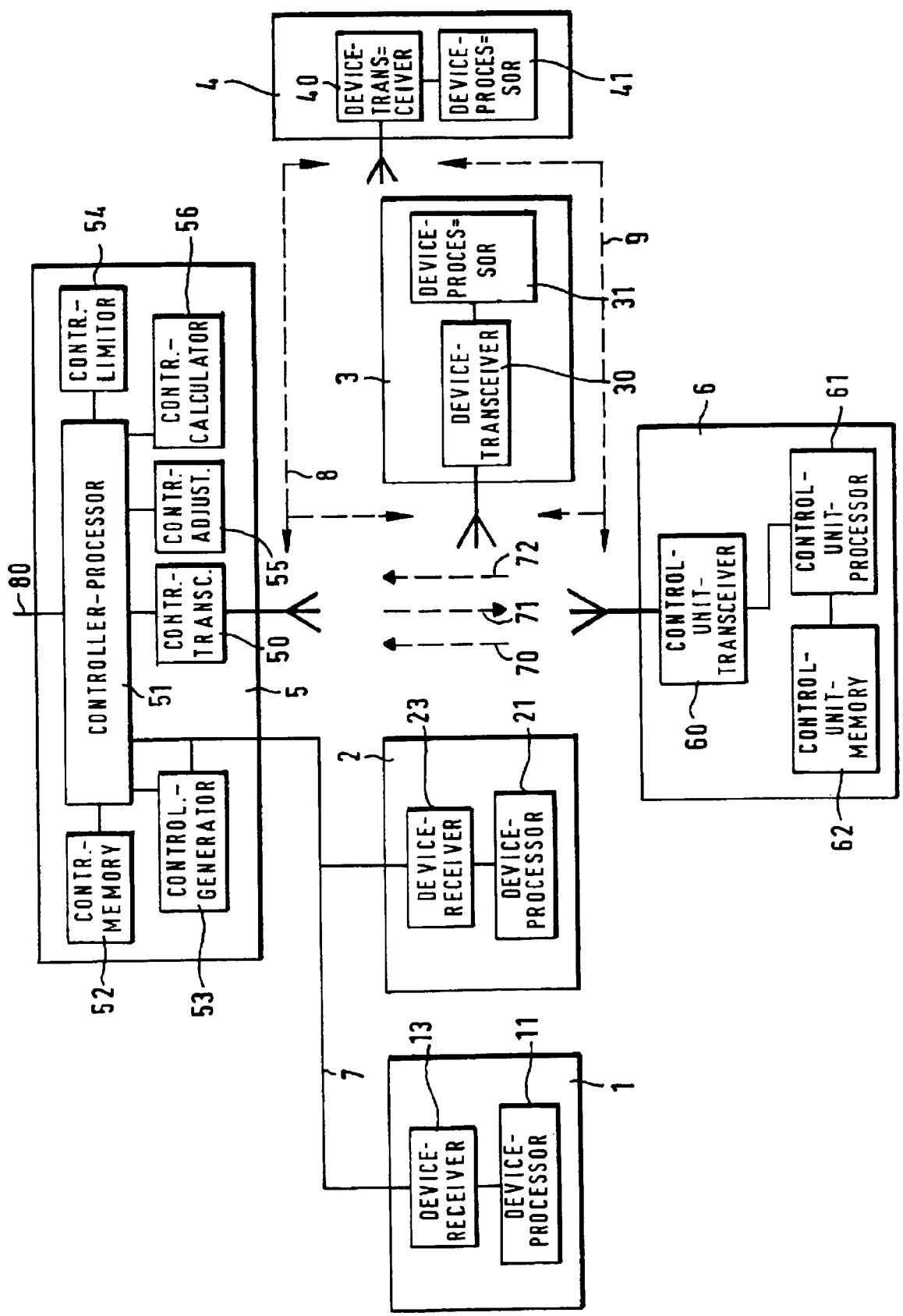

TELECOMMUNICATION SYSTEM INCLUDING DEVICE CONTROLLER WITH DOWNLOADABLE INTERFACE AND REMOTE CONTROL, AND METHOD FOR CONTROLLING COMMUNICATION SYSTEM

BACKGROUND OF THE INVENTION

The invention relates to a telecommunication system comprising a controller to be coupled to a network and comprising a controller-generator for generating at least one device-signal destined for at least one device, a first device coupled to said controller and comprising a first device-receiver for receiving at least one device-signal, a second device coupled to said controller and comprising a second device-receiver for receiving at least one device-signal, a remote control unit comprising a control-unit-sender for sending a control-signal for remotely controlling at least one device.

Such a telecommunication system is known from WO 98/59284, in which said controller is a digital TV coupled to a public or private telecommunication network, with said devices being a VCR, a dishwasher, a refrigerator, a telephone, a security system etc. Each one of these devices can be coupled to said controller via a wire and/or wirelessly, and can be controlled via the TV's remote control unit and a HTML page to be shown on said TV.

Such a telecommunication system is disadvantageous, inter alia, due to the remote control of devices always taking place through visual contact between user and TV.

SUMMARY OF THE INVENTION it is an object of the invention, inter alia, to provide a telecommunication system as described in the preamble, in which devices can be remotely controlled in a more user-friendly way.

Thereto, the telecommunication system according to the invention is characterised in that said controller comprises a controller-sender for sending an interface in response to a trigger-signal and destined for said remote control unit and comprises a controller-receiver for receiving said trigger-signal, said remote control unit comprises a control-unit-receiver for receiving said interface and comprises a control-unit-memory for storing said interface.

By downloading said interface from said controller into said remote control unit (directly or indirectly via at least one device) in response to said trigger-signal and storing said interface in said remote control unit a more user-friendly control has been created, due to said interface now being as close to a user as possible. This interface for example comprises a device-interface and/or comprises a user-interface.

For example said visual contact between user and controller no longer is necessary, in case of said telecommunication system being a Digital Home Network or DHN, the control of any device could be done anywhere in the home, whereby said controller could be a gateway/server, and said devices could be a TV, a VCR, a refrigerator, a microwave oven, a security system etc., and said remote control unit could be an ordinary remote control unit provided with a display, or for example a (wireless) screenphone like described in EP 907271, EP 907272, EP 907273, EP 907274 and EP 907275.

The invention is based on the insight, inter alia, that when a remote control unit comprises more information and/or has more possibilities, the efficiency of the entire system is increased.

The invention solves the problem, inter alia, of providing a telecommunication system which is more user-friendly.

A first embodiment of the telecommunication system according to the invention is characterised in that said control-unit-sender is adapted for sending said trigger-signal.

In this case said trigger-signal is sent from said remote control unit to said controller, and said downloading is then initiated at said remote control unit, for example by a user.

A second embodiment of the telecommunication system according to the invention is characterised in that said trigger-signal comprises an identification-code for identifying a user.

In this case said user has identified himself/herself at said remote control unit, for example just by touching a finger-print detector of said remote control unit, and/or by using a smart card, and/or by generating a pin-code, and/or by voice-recognition etc. In response to said identification-code, a first user could receive a first user-interface, and a second user could receive a second user-interface at said remote control unit, which allows a more individual treatment of each user (for example a preferred language and/or certain preferred functions).

A third embodiment of the telecommunication system according to the invention is characterised in that said trigger-signal comprises either at least a first code for indicating said first device or at least a second code for indicating said second device.

In this case when operating said remote control unit for generating said control-signal a selection is already made to define which device (or which group of devices) is going to be controlled. In response to a first code, for example a first device-interface is downloaded, and in response to said second code, for example a second device-interface is downloaded.

A fourth embodiment of the telecommunication system according to the invention is characterised in that said controller comprises a controller-detector for detecting an interface-amendment, whereby said controller-sender is adapted for sending a request-signal destined for said remote control unit, said control-unit-receiver is adapted for receiving said request-signal, whereby said control-unit-sender is adapted for sending said trigger-signal in response to said receiving of said request-signal.

By detecting said interface-amendment (a real amendment to an existing interface or an arrival of a new interface) and in response sending said request-signal from said controller to said remote control unit (directly or indirectly via at least one device), this remote control unit is informed about said interface-amendment, after which said trigger-signal is sent back from said remote control unit to said controller (directly or indirectly via at least one interface) for example automatically without a user being involved (for example in case of a device-interface-amendment) or for example in response to a user-action (for example in case of a user-interface-amendment) which user-action could be a finger-print, a smart card, a pin-code, voice-recognition etc. Said amendment of said interface-amendment could be generated by a user (for example by using an HTML hyperlink: an interface is displayed, and by selecting for example one or more buttons, the interface is changed like a link on the Web, to display a new interface) for example via said remote control unit or via said controller (directly or indirectly via at least one device like said pc) and/or could be generated automatically in said network and supplied to said controller coupled to said network etc.

A fifth embodiment of the telecommunication system according to the invention is characterised in that at least a part of a location in said control-unit-memory at which location said interface has been stored becomes overwritable in response to a further trigger-signal.

In this case said control-unit-memory could be of a relatively small size, and could comprise for example one or a few interfaces, whereby each time an interface is needed (a user-interface due to a certain user operating said remote control unit and/or a device-interface due to a certain device needing to be operated via said remote control unit) it is downloaded and stored for a fixed amount of time and/or until an other interface has arrived and/or until said control-unit-memory is almost full etc. Said further trigger-signal could be generated at said remote control unit (by a clock or a memory occupation indicator) and/or could be generated at said controller for example and/or could even be at least partly equal to said request-signal.

The invention further relates to a controller to be coupled to a network and for use in a telecommunication system comprising said controller comprising a controller-generator for generating at least one device-signal destined for at least one device, a first device coupled to said controller and comprising a first device-receiver for receiving at least one device-signal, a second device coupled to said controller and comprising a second device-receiver for receiving at least one device-signal, a remote control unit comprising a control-unit-sender for sending a control-signal for remotely controlling at least one device.

The controller according to the invention is characterised in that said controller comprises a controller-sender for sending an interface in response to a trigger-signal and destined for said remote control unit and comprises a controller-receiver for receiving said trigger-signal.

The invention yet further relates to a device coupled to a controller and for use in a telecommunication system comprising said controller to be coupled to a network and comprising a controller-generator for generating at least one device-signal destined for at least one device, a first device coupled to said controller and comprising a first device-receiver for receiving at least one device-signal, a second device coupled to said controller and comprising a second device-receiver for receiving at least one device-signal, a remote control unit comprising a control-unit-sender for sending a control-signal for remotely controlling at least one device.

The device according to the invention is characterised in that said trigger-signal comprises either at least a first code for indicating said first device or at least a second code for indicating said second device.

The invention also relates to a remote control unit for remotely controlling at least one device and for use in a telecommunication system comprising a controller to be coupled to a network and comprising a controller-generator for generating at least one device-signal destined for at least one device, a first device coupled to said controller and comprising a first device-receiver for receiving at least one device-signal, a second device coupled to said controller and comprising a second device-receiver for receiving at least one device-signal, said remote control unit comprising a control-unit-sender for sending a control-signal for remotely controlling at least one device.

The remote control unit according to the invention is characterised in that said remote control unit comprises a control-unit-receiver for receiving an interface originating from said controller and comprises a control-unit-memory for storing said interface.

The invention further also relates to a method for controlling a telecommunication system comprising a controller to be coupled to a network and comprising a controller-generator for generating at least one device-signal destined for at least one device, a first device coupled to said controller and comprising a first device-receiver for receiving at least one device-signal, a second device coupled to said controller and comprising a second device-receiver for receiving at least one device-signal, a remote control unit comprising a control-unit-sender for sending a control-signal for remotely controlling at least one device.

The method according to the invention is characterised in that said method comprises the steps of sending an interface from said controller to said remote control unit in response to a trigger-signal, receiving said interface and storing said interface at said remote control unit.

The documents EP 970271, EP 907272, EP907273, EP907274, EP 907275 all disclose systems related to screenphones, neither one of these documents nor WO 98/59284 discloses the telecommunication system according to the invention. All references including further references cited with respect to and/or inside said references are considered to be incorporated in this patent application.

BRIEF DESCRIPTION OF THE DRAWINGS

The invention will be further explained at the hand of an embodiment described with respect to a drawing, whereby FIG. 1 discloses a telecommunication system according to the invention comprising a controller according to the invention and devices according to the invention and a remote control unit according to the invention.

DETAILED DESCRIPTION OF THE INVENTION

The telecommunication system according to the invention shown in FIG. 1 comprises a first device 1 and a second device 2 both coupled to a controller 5 via a wired connection 7, and comprises a third device 3 and a fourth device 4 which both can be coupled to controller 5 via a wireless connection 8, and comprises a remote control unit 6 which can communicate with device 3 and device 4 via a wireless connection 9 and which can exchange signals 70 (to be sent), 71 (to be received) and 72 (to be sent) with controller 5.

Device 1 comprises a device-processor 11 coupled to a device-receiver 13 which is coupled to said wired connection 7. Device 2 comprises a device-processor 21 coupled to a device-receiver 23 which is coupled to said wired connection 7.

Device 3 comprises a device-transceiver 30 coupled on the one side to an antennae (for communication with controller 5 via wireless connection 8 and with remote control unit 6 via wireless connection 9) and on the other side to a device-processor 31. Said device-transceiver 30 comprises a device-receiver and a device-sender. Device 4 comprises a device-transceiver 40 coupled on the one side to an antennae (for communication with controller 5 via wireless connection 8 and with remote control unit 6 via wireless connection 9) and on the other side to a device-processor 41. Said device-transceiver 40 comprises a device-receiver and a device-sender.

Controller 5 comprises a controller-transceiver 50 coupled on the one side to an antennae (for communication with devices 3,4 via wireless connection 8 and with remote control unit 6 via signals 70–72) and on the other side to a controller-processor 51. Controller-processor 51 is coupled to controller-memory 52 and to controller-generator 53 (which is coupled to wired connection 7) and to wired connection 7 and to a controller-limitor 54 and to a controller-adjustor 55 and to a controller-calculator 56. Said controller-transceiver 50 comprises a controller-receiver and a controller-sender.

Remote control unit 6 comprises a control-unit-transceiver 60 coupled on the one side to an antennae (for communication with devices 3,4 via wireless connection 9 and with controller 5 via signals 70–72) and on the other side to a control-unit-processor 61, which is coupled to a control-unit-memory 62. Said control-unit-transceiver 60 comprises a control-unit-receiver and a control-unit-sender.

The telecommunication system according to the invention functions as follows.

According to a first embodiment, a user who wants to remotely control one of said devices operates remote control unit 6 and presses for example a first (second/third/fourth) activation button indicating device 1 (2/3/4), in response to which via control-unit-processor 61 and control-unit-transceiver 60 a control-signal is sent (for example indicated as signal 70) comprising a first (second/third/fourth) code indicating said device 1 (2/3/4) to controller-transceiver 50. In controller 5, said control-signal and said first (second/third/fourth) code are detected by controller-processor 51. In response, controller-processor 51 consults controller-memory 52 and finds a first (second/third/fourth) information-signal, which (for example indicated as signal 71) via controller-processor 51 and controller-transceiver 50 is sent to remote control unit 6, in which via control-unit-transceiver 60 said first (second/third/fourth) information-signal is detected by control-unit-processor 61. For example at a display of said remote control unit 6 said first (second/third/fourth) information signal is shown, thereby indicating for example the ten most used functions of device 1 (2/3/4). Then said user can select one of said ten functions by pressing one or more selection buttons, in response to which via control-unit-processor 61 and control-unit-transceiver 60 a reaction-signal is sent to controller-transceiver 50 (for example indicated as signal 72) comprising a function code indicating a selected function. In controller 5, said reaction-signal and said function code are detected by controller-processor 51. In response, controller-processor 51 consults controller-memory 52 and finds a first (second/third/fourth) device-signal for example comprising said function code, which via controller-processor 51 and controller-generator 53 (controller-transceiver 50) is sent to device 1 or 2 via wired connection 7 (device 3 or 4 via wireless connection 8). As a result, device 1 (2/3/4) is controlled by said user.

According to a first alternative to said first embodiment, said control-signal is not sent directly from control-unit-transceiver 60 to controller-transceiver 50 but is sent indirectly via wireless connection 9 and device-transceiver 30 and/or 40 and wireless connection 8. According to a second alternative to said first embodiment, said information-signal is not sent directly from controller-transceiver 50 to control-unit-transceiver 60 but is sent indirectly via wireless connection 8 and device-transceiver 30 and/or 40 and wireless connection 9. According to a third alternative to said first embodiment, said reaction-signal is not sent directly from control-unit-transceiver 60 to controller-transceiver 50 but is sent indirectly via wireless connection 9 and device-transceiver 30 and/or 40 and wireless connection 8. According to these alternatives devices 3 and 4 (according to this example) are used as a kind of repeater-stations, whereby more options become possible like preparing said devices and/or checking their availability etc. According to a fourth alternative, two or more of these alternatives are combined, and/or one or more of these alternatives is/are combined with the original first embodiment, for example to decrease the risk of a bad reception by sending/receiving twice via different routes, in which case a combination of processor and transceiver could be provided with an anti-collision solution (for example a software program that during a small amount of time after each reception ignores the receival of further signals or a piece of hardware for example having some kind of echo-cancellation function and/or being able to distinguish between equal signals arriving from different origins).

Said activation buttons and said selection buttons could be different from each other (thereby using more surface but giving a better overview) but could also be equal to one another (thereby saving surface) whereby said display could support the use of these buttons by for example displaying the present function of said buttons and the history (previous functions) etc. In this case one button is firstly used to activate one device and then used to select one function of this one device. An other possibility is for example to use a predefined or non-predefined button for indicating the user's wish to remotely control in general (signal 70), in response to which an overview of all devices is sent back (signal 71), in response to which said user selects one device (signal 72), in response to which all/certain functions are sent back (a signal 73 not shown), after which said user selects a function (a signal 74 not shown), which selection (in some cases) could be sent back (a signal 75 not shown) to be confirmed by said user (a signal 76 not shown).

Said control-signal could therefore be an activation signal in general, or an selection signal for selecting a device or group of devices, but could also be already completely defining device and function to be controlled remotely. In that case said information-signal could be just a signal giving an overview and/or status and/or mode and/or statistics etc., whereby the receival of said information-signal at said remote control unit is then confirmed by said reaction-signal, which in this case is not generated by a user but is sent automatically in response to a detection of said information-signal.

Remote control unit 6 could in addition to said display and/or buttons etc. and/or replacing said display and/or buttons etc. be provided with a loudspeaker for generating voice/speech for informing said user and with a microphone and a voice/speech recognizer for receiving commands from said user. Preferably, a telephone function could then be added to said remote control unit, or when looking at it vice versa, a cordless/wireless/mobile telephone could be used (possibly after being amended) as remote control unit.

Said device-signal could comprise a first (second/third/fourth) code to indicate device 1 (2/3/4), in which case said device-signal can be sent to all devices, due to each one of these devices being able to decide whether said device-signal is destined for this particular device or not. In case said device-signal does not comprise one or more of said codes, either said device-signal is sent only to the relevant device, for example via wired connection 7 with one of both devices 1 and 2 being disabled by controller 5 (either done before or via a separate connection not shown), or for example via wireless connection 8 with both devices 3 and 4 using different frequencies and/or timeslots.

Said devices 1 and/or 2 could also be provided with a device-transceiver 10 and/or 20 not shown in the drawing, to be able to also perform as a kind of repeater-station(s). Each device 1,2,3,4 will at least hove a device-receiver 13,23 or a device-transceiver 30,40 having at least a receiving function. A device could further comprise for example a TV, in which case there will also be a TV-interface for monitoring what is happening in said TV (channel-control, volume-control, teletext etc.) and for translating said device-signal into a suitable control-signal for controlling said TV. Another device could further comprise a VCR, in which case there will also be a VCR-interface for monitoring what is happening in said VCR (playing, recording, programming etc.) and for translating said device-signal into a suitable control-signal for controlling said VCR. Another device could further comprise a refrigerator, in which case there will also be a refrigerator-interface for monitoring said refrigerator (temperature, products present in several departments, power consumption etc.) and for controlling said refrigerator and/or refrigerator-interface (moving a camera inside said refrigerator, adjusting the temperature etc.). Another device could further comprise a microwave oven, in which case there will also be a microwave oven-interface etc. Another device could further comprise a security system etc.

Said controller 5 is connected to network 80 for receiving television signals, radio signals etc. for example, and/or for receiving/transmitting telephone signals, Internet signals etc. for example. As described in WO 98/59284, said creation of home network macros here also belongs to the possibilities. However, due to the much more intelligent communication between controller and remote control unit in accordance with the invention, a system has been created which is more flexible and more user-friendly.

Said transceivers could be based upon InfraRed, which generally requires two transceivers to 'see' each other before communication is possible. Preferably, said transceivers are based upon an analog or digital (amplitude/frequency/phase) modulation technique which would allow communication through an entire house.

According to a second embodiment, a user who wants to remotely control one of said devices operates remote control unit 6, in response to which via control-unit-processor 61 and control-unit-transceiver 60 a trigger-signal is sent (for example indicated as signal 70) to controller-transceiver 50. In controller 5, said trigger-signal is detected by controller-processor 51. In response, controller-processor 51 consults controller-memory 52 and finds an interface, which (for example indicated as signal 71) via controller-processor 51 and controller-transceiver 50 is sent to remote control unit 6, in which via control-unit-transceiver 60 said interface is detected by control-unit-processor 61 and stored in control-unit-memory 62. For example at a display of said remote control unit 6, at least a part of said interface could be shown, thereby indicating for example user-possibilities/preferences and/or device-possibilities/preferences. Then said user can select/change/check/program one or more of said possibilities/preferences, etc., thereby for example generating and sending back a reaction-signal (for example indicated as signal 72) etc. As a result, an interface is stored into said remote control unit 6 giving the option of selecting/changing/checking/programming possibilities/preferences by said user.

According to a first alternative to said second embodiment, said trigger-signal is not sent directly from control-unit-transceiver 60 to controller-transceiver 50 but is sent indirectly via wireless connection 9 and device-transceiver 30 and/or 40 and wireless connection 8. According to a second alternative to said second embodiment, said interface is not sent directly from controller-transceiver 50 to control-unit-transceiver 60 but is sent indirectly via wireless connection 8 and device-transceiver 30 and/or 40 and wireless connection 9. According to a third alternative to said second embodiment, said reaction-signal is not sent directly from control-unit-transceiver 60 to controller-transceiver 50 but is sent indirectly via wireless connection 9 and device-transceiver 30 and/or 40 and wireless connection 8. According to these alternatives devices 3 and 4 (according to this example) are used as a kind of repeater-stations, whereby more options become possible like preparing said devices and/or checking their availability etc. According to a fourth alternative, two or more of these alternatives are combined, and/or one or more of these alternatives is/are combined with the original second embodiment, for example to decrease the risk of a bad reception by sending/receiving twice via different routes, in which case a combination of processor and transceiver could be provided with an anti-collision solution (for example a software program that during a small amount of time after each reception ignores the receival of further signals or a piece of hardware for example having some kind of echo-cancellation function and/or being able to distinguish between equal signals arriving from different origins).

Said devices 1 and/or 2 could also be provided with a device-transceiver 10 and/or 20 not shown in the drawing, to be able to also perform as a kind of repeater-station(s). Each device 1,2,3,4 will at least have a device-receiver 13,23 or a device-transceiver 30,40 having at least a receiving function. A device could further comprise for example a TV, a VCR, a refrigerator, a microwave oven, a security system etc., as described before.

According to a fifth alternative to said second embodiment, said trigger-signal comprises an identification-code for identifying a user, which identification-code for example is added to said trigger-signal by said control-unit-processor 61 in response to a user having touched a fingerprint detector coupled to said control-unit-processor 61 or having used a smart card via a smard card reader coupled to control-unit-processor 61 or having generated a pin-code via a keyboard coupled to control-unit-processor 61 or having used voice or speech via a microphone coupled to control-unit-processor 61. As a result, a first user will get his own first user interface and a second user will get his own second user interface, thereby offering a more individual treatment.

According to a sixth alternative to said second embodiment, said trigger-signal comprises for example a first (second) code for indicating said first (second) device 1 (2), which first (second) code for example is added to said trigger-signal by said control-unit-processor 61 in response to a user having selected said first (second) device to be controlled, as a result a first (second) device-interface is downloaded.

According to a seventh alternative to said second embodiment, controller 5 comprises a controller-detector for example in the form of software implemented via controller-processor 51 and controller-memory 52, or in the form of a hardware unit not shown in the drawing, which detects an interface-amendment, for example due to an amendment (defining a device-amendment and/or a user-amendment) having arrived via network 80, or due to a new device being connected to controller 5, or due to a user changing a user-interface via a device in the form of a pc, in response to which a request-signal (a signal 69 not shown) is sent via controller-transceiver 50 to control-unit-transceiver 60 directly or indirectly as described before. Then, in remote control unit 6, said trigger signal is generated, for example by control-unit-processor 61, to allow said interface-amendment (a new one or a new part for an old one) to be downloaded.

According to an eigthth alternative to said second embodiment, at least a part of a location in said control-unit-memory 62 at which location said interface has been stored becomes overwritable in response to a further trigger-signal. In this case said control-unit-memory 62 could be of a relatively small size, and could comprise for example one or a few interfaces, whereby each time an interface is needed (a user-interface due to a certain user operating said remote control unit and/or a device-interface due to a certain device needing to be operated via said remote control unit) it is downloaded and stored for a fixed amount of time and/or until an other interface has arrived and/or until said control-unit-memory is almost full etc. Said further trigger-signal could be generated at said remote control unit 6 (by a clock or a memory occupation indicator which both could be realised via control-unit-processor 61) and/or could be generated at said controller 5 (comprising a clock or a memory occupation indicator for indicating the memory occupation in remote control unit 6 which both could be realised via controller-processor 51) in which case it could be at least partly equal to said request-signal.

Said controller 5 is connected to network 80 for receiving television signals, radio signals etc. for example, and/or for receiving/transmitting telephone signals, Internet signals etc. for example. As described in WO 98/59284, said creation of home network macros here also belongs to the possibilities. However, due to possibility of the downloading interfaces into said remote control unit in accordance with the invention, a system has been created which is more flexible and more user-friendly.

According to a third embodiment, a user who wants to remotely control one of said devices operates remote control unit 6, by for example touching a finger-print detector coupled to said control-unit-processor 61 or using a smart card via a smard card reader coupled to control-unit-processor 61 or generating a pin-code via a keyboard coupled to control-unit-processor 61 or using voice or speech via a microphone coupled to control-unit-processor 61. In response, via control-unit-processor 61 and control-unit-transceiver 60 a user-identification-signal is sent (for example indicated as signal 70) to controller-transceiver 50. In controller 5, said user-identification-signal is detected by controller-processor 51. In response, controller-processor 51 consults controller-memory 52 comprising user-dependent-signals which are activated in response to said user-identification-signal and for example compared with said user-identification-signal resulting in finding an identity of said user. As a consequence, for example, a user belonging to a family is allowed to operate/use the entire system, and an other user not belonging to the family is not allowed to operate/use the system and does not get access.

According to a first alternative to said third embodiment, said user is a parent in the family, who wants to watch an adult channel on the TV. The parent operates remote control unit 6 in such a way that either via control-unit-processor 61 and control-unit-transceiver 60 said user-identification-signal together with said control-signal/reaction-signal (defining said adult channel on said TV) is sent (for example indicated as signal 70) to controller-transceiver 50 or via control-unit-processor 61 and control-unit-transceiver 60 said user-identification-signal and said control-signal/reaction-signal are sent separately from each other (for example indicated as signals 70 and 72) to controller-transceiver 50. In controller 5, said user-identification-signal and said control-signal/reaction-signal are detected by controller-processor 51. In response to said user-identification-signal, controller-processor 51 consults controller-memory 52 comprising user-dependent-signals which are activated in response to said user-identification-signal and which for example define which control-signals/reaction-signals are allowed for said identified user and which are not. Then, in response to said control-signal/reaction-signal, controller-memory 52 is consulted for finding a device-signal corresponding to said control-signal/reaction-signal, which device-signal via controller-processor 51 and controller-limitor 54 (without being limited) and controller-processor 51 and controller-generator 53 is sent to one of said devices comprising said TV for switching to said adult channel.

According to a second alternative to said third embodiment, said user is a child in the family, who wants to watch an adult channel on the TV (or wants to increase the sound volume of an other channel a lot). The child operates remote control unit 6 in such a way that either via control-unit-processor 61 and control-unit-transceiver 60 said user-identification-signal together with said control-signal/reaction-signal (defining said adult channel on said TV or said increased sound volume) is sent (for example indicated as signal 70) to controller-transceiver 50 or via control-unit-processor 61 and control-unit-transceiver 60 said user-identification-signal and said control-signal/reaction-signal are sent separately from each other (for example indicated as signals 70 and 72) to controller-transceiver 50. In controller 5, said user-identification-signal and said control-signal/reaction-signal are detected by controller-processor 51. In response to said user-identification-signal, controller-processor 51 consults controller-memory 52 comprising user-dependent-signals which are activated in response to said user-identification-signal and which for example define which control-signals/reaction-signals are allowed for said identified user and which are not. Then, in response to said control-signal/reaction-signal, controller-memory 52 is consulted for finding a device-signal corresponding to said control-signal/reaction-signal, which device-signal in case of defining said adult channel via controller-processor 51 and controller-limitor 54 is blocked due to said child not being allowed to watch this adult channel or which device-signal in case of defining said increased volume via controller-processor 51 and controller limitor 54 (thereby being limited due to said child being allowed to increase the sound volume up to a certain limit) and controller-processor

51 and controller-generator 53 is sent to one of said devices comprising said TV for increasing said sound volume up to said limit.

Said controller-limitor 54 con be realised by hardware, or software, or a combination of both, and can be located separately from said controller-processor 51 and controller-memory 52, or can be partly or completely integrated with said controller-processor 51 and controller-memory 52. For example, controller-limitor 54 could be realised efficiently by storing user-dependent-device-signals in said controller-memory 52.

According to a third alternative to said third embodiment, for example in response to the receival of said user-identification-signal or of said control-signal or of said reaction-signal at controller 5, via controller-transceiver 50 an information signal is sent to remote control unit 6, at which remote control unit 6 control-unit-receiver 60 receives said information signal, for example for informing said user via for example a display of said remote control unit 6 that said user has tried to go beyond his possibilities, or for saying welcome to said identified user, or to give said user an overview of his possibilities or of actions in the past etc.

According to a fourth alternative to said third embodiment, in said controller, at the hand of said control-signals and/or reaction-signals and/or codes belonging to those signals, controller-calculator 56 makes calculations and controller-adjustor 55 adjusts at least one of said user-dependent-signals stored in controller-memory 52 in response to said calculations. Generally this will be done user-dependently, whereby either in controller 5 a user-identity is stored after a user having identified himself and for a certain amount of time or until an other user has identified himself at a certain remote control unit (which then in case of more remote control units automatically adds its unit-code to said control-signals and/or reaction-signals), or in remote control unit 6 a user-identity is stored after a user having identified himself and for a certain amount of time or until an other user has identified himself at this particular remote control unit (which then automatically adds this user-identification-code to said control-signals and/or reaction-signals), or said user has to identify himself each time control-signals and/or reaction-signals are generated. But a certain user-independency. with respect to said calculations and/or adjustments is not to be excluded. In response for example, said controller-generator 53 generates adjusted device-signals in response to at least one adjusted user-dependent-signal or for example said controller-transceiver 50 sends adjusted information-signals.

For example, in case of a weather channel on the TV being selected by a parent, in response to an incoming telephone call, the sound volume of the TV is reduced by 50% or from sound level 6 to sound level 3, and when said controller has detected this twice, the third time a telephone call arrives during the weather channel, said sound volume is automatically (or after a confirmation from said user) reduced, and for example in case of a cartoon channel on the TV being selected by a child, in response to an incoming telephone call, the sound volume of the TV is reduced by 75% or from sound level 8 to sound level 2, and when said controller has detected this five times for example, the sixth time a telephone call arrives during the cartoon channel, said sound volume is automatically (and this time preferably not after a confirmation from said young user) reduced. The term calculations does not exclude calculations of a low complexity like just comparing two values (a present value and a value from the past both belonging to the same device/function, or two values belonging to different devices and/or functions, or a value and a threshold), but could of course be related to calculations of any possible complexity like calculating an average value for ten subsequent values for one function and then comparing this average value with values for other functions of the same device and/or functions of other devices etc.

Said controller-calculator 56 and/or said controller-adjustor 55 can be realised by hardware, or software, or a combination of both, and can be located separately from said controller-processor 51 and controller-memory 52, or can be partly or completely integrated with said controller-processor 51 and controller-memory 52. For example, controller-calculator 56 as well as controller-adjustor 55 could be realised efficiently by software stored in said controller-memory 52 and processed by controller-processor 51.

All embodiments are just embodiments and do not exclude other embodiments not shown and/or described. All alternatives are just alternatives and do not exclude other alternatives not shown and/or described. Each part of each embodiment and/or of each alternative to said embodiment can be combined with each other embodiment and/or each other alternative to said embodiment. Each part of devices 1, 2, 3 and 4, of controller 5 and of remote control unit 6 can be divided into at least two subparts, and at least two parts of devices 1, 2, 3 and 4, of controller 5 and of remote control unit 6 can be partly or entirely combined into one or more new parts. Especially but not exclusively for controller 5 it is possible to shift certain functions and/or parts into network 80, for example at least a part of controller-memory 52, of controller-limitor 54, controller-adjustor 55, controller-calculator 56, and/or controller-processor 51 could be located in network 80.

What is claimed is:

1. Telecommunication system comprising:
   a controller coupled to a network and comprising a controller-generator for generating at least one device-signal destined for at least one device for controlling operation of said at least one device;
   a first device coupled to said controller and comprising a first device-receiver for receiving at least one device-signal;
   a second device coupled to said controller and comprising a second device-receiver for receiving at least one device-signal; and
   a remote control unit comprising a control-unit-sender for sending a control-signal for remotely controlling at least one device,
   wherein
   said controller comprises:
      a controller-sender for sending to said remote control unit an interface in response to a trigger-signal; and
      a controller-receiver for receiving said trigger-signal,
   said remote control unit comprises:
      a control-unit-receiver for receiving said interface; and
      a control-unit-memory for storing said interface, and
   wherein said control-unit-sender is adapted for sending said trigger-signal, and wherein said trigger-signal comprises an identification-code for identifying a user.

2. The telecommunication system according to claim 1, wherein said trigger-signal comprises either at least a first code for indicating said first device or at least a second code for indicating said second device.

3. The telecommunication system according to claim 1, wherein:

said controller comprises a controller-detector for detecting an interface-amendment, whereby said controller-sender is adapted for sending a request-signal destined for said remote control unit, and said control-unit-receiver is adapted for receiving said request-signal, whereby said control-unit-sender is adapted for sending said trigger-signal in response to said receiving of said request-signal.

4. The telecommunication system according to claim 1, wherein at least a part of a location in said control-unit-memory at which location said interface has been stored becomes overwritable in response to a further trigger-signal.

5. A controller to be coupled to a network and for use in a telecommunication system comprising a first device coupled to said controller and comprising a first device-receiver for receiving at least one device-signal for controlling operation of said at least one device, a second device coupled to said controller and comprising a second device-receiver for receiving at least one device-signal, and a remote control unit comprising a control-unit-sender for sending a control-signal for remotely controlling at least one device, said controller comprising:

a controller-generator for generating at least one device-signal destined for at least one device;

a controller-sender for sending an interface to said remote control unit in response to a trigger-signal; and a controller-receiver for receiving said trigger-signal, wherein said trigger-signal comprises an identification-code for identifying a user.

6. The controller as claimed in claim 5, wherein said trigger-signal comprises either at least a first code for indicating said first device or at least a second code for indicating said second device.

7. A remote control unit for remotely controlling at least one device and for use in a telecommunication system comprising a controller to be coupled to a network and comprising a controller-generator for generating at least one device-signal destined for at least one device for controlling operation of said at least one device, first device coupled to said controller and comprising a first device-receiver for receiving at least one device-signal, a second device coupled to said controller and comprising a second device-receiver for receiving at least one device-signal, said remote control unit comprising:

a control-unit-sender for sending a control-signal for remotely controlling at least one device;

a control-unit-receiver for receiving an interface originating from said controller in response to a trigger-signal; and a control-unit-memory for storing said interface, wherein said trigger-signal comprises an identification-code for identifying a user.

8. The remote control unit as claimed in claim 7, wherein said trigger-signal comprises either at least a first code for indicating said first device or at least a second code for indicating said second device.

9. A method for controlling a telecommunication system comprising a controller to be coupled to a network and comprising a controller-generator for generating at least one device-signal destined for at least one device for controlling operation of said at least one device, a first device coupled to said controller and comprising a first device-receiver for receiving at least one device-signal, a second device coupled to said controller and comprising a second device-receiver for receiving at least one device-signal, and a remote control unit comprising a control-unit-sender for sending a control-signal for remotely controlling at least one device, said method comprising:

sending an interface from said controller to said remote control unit in response to a trigger-signal;

receiving said interface; and storing said interface at said remote control unit, wherein said trigger-signal comprises an identification-code for identifying a user.

10. The method as claimed in claim 9, wherein said trigger-signal comprises either at least a first code for indicating said first device or at least a second code for indicating said second device.

* * * * *